United States Patent
Jung et al.

(10) Patent No.: US 11,502,315 B2
(45) Date of Patent: Nov. 15, 2022

(54) SYSTEM AND METHOD FOR PURGING CONDENSATE WATER AND HYDROGEN OF FUEL CELL STACK

(71) Applicants: HYUNDAI MOTOR COMPANY, Seoul (KR); KIA CORPORATION, Seoul (KR)

(72) Inventors: Bong Hyun Jung, Suwon-si (KR); Ik Jae Son, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/499,396

(22) Filed: Oct. 12, 2021

(65) Prior Publication Data
US 2022/0149399 A1    May 12, 2022

(30) Foreign Application Priority Data
Nov. 10, 2020    (KR) .................. 10-2020-0149012

(51) Int. Cl.
*H01M 8/04119*    (2016.01)
*H01M 8/04828*    (2016.01)

(52) U.S. Cl.
CPC ... *H01M 8/04156* (2013.01); *H01M 8/04843* (2013.01); *H01M 2250/20* (2013.01)

(58) Field of Classification Search
CPC .......... H01M 8/04156; H01M 8/04843; H01M 8/04225; H01M 8/04302; H01M 8/04179
See application file for complete search history.

(56) References Cited

U.S. PATENT DOCUMENTS

| | | | |
|---|---|---|---|
| 2008/0152961 A1* | 6/2008 | Zhou ................ | H01M 8/04313 429/444 |
| 2011/0048837 A1* | 3/2011 | Kwon ............... | H01M 8/04805 429/456 |
| 2015/0280260 A1* | 10/2015 | Lee .................. | H01M 8/04164 429/414 |
| 2020/0036021 A1* | 1/2020 | Takahashi ......... | B60L 3/0053 |

* cited by examiner

*Primary Examiner* — Stewart A Fraser
(74) *Attorney, Agent, or Firm* — McDonnell Boehnen Hulbert & Berghoff LLP

(57) ABSTRACT

The present disclosure provides a system and a method for purging the condensate water and hydrogen of a fuel cell stack, which may allow the condensate water and hydrogen discharged from a stack to be directly bypassed to an exhaust line of a humidifier rather than a shell side of the humidifier to be purged to the atmosphere according to the operation state and operation condition of the stack, thereby solving a problem in that an inverse voltage is generated upon cold operation of a fuel cell system, a flooding phenomenon occurs in the stack, or the like to improve the operation stability of the stack and the operation efficiency of the fuel cell system.

14 Claims, 2 Drawing Sheets

SYSTEM AND METHOD FOR PURGING CONDENSATE WATER AND HYDROGEN OF FUEL CELL STACK

CROSS REFERENCE TO RELATED APPLICATIONS

This application claims under 35 U.S.C. § 119(a) the benefit of priority to Korean Patent Application No. 10-2020-0149012 filed on Nov. 10, 2020, the entire contents of which are incorporated herein by reference.

BACKGROUND

(a) Technical Field

The present disclosure relates to a system and a method for purging the condensate water and hydrogen of a fuel cell stack, and more specifically, to a system and a method for purging the condensate water and hydrogen of a fuel cell stack, which may directly discharge parts of condensate water and hydrogen discharged from a fuel cell stack to the atmosphere according to the state and operation condition of the fuel cell stack, thereby improving operation stability and operation efficiency of the fuel cell stack.

(b) Background Art

A fuel cell system is configured to include a fuel cell stack configured to generate electrical energy, a hydrogen supply system configured to supply fuel (hydrogen) to a fuel cell stack, an air supply system configured to supply oxygen in the air, which is an oxidizer necessary for electrochemical reactions, to the fuel cell stack, a heat and water management system configured to control the operation temperature of the fuel cell stack, and the like.

Generally, the fuel cell stack (hereinafter, referred to as 'stack') is provided as a structure in which a plurality of unit cells including an electrolyte membrane, an anode which is an object to which hydrogen ($H_2$) is supplied as a catalyst electrode layer located on one side of the electrolyte membrane, a cathode which is an object to which air is supplied as a catalyst electrode layer located on the other side of the electrolyte membrane, a gas diffusion layer disposed on the outsides of the anode and the cathode, and the like are laminated and assembled, in order to react hydrogen ($H_2$) and oxygen ($O_2$) to generate electrical energy.

Therefore, when the fuel cell system is operated, the hydrogen supplied to the anode of the stack is separated into proton and electron, and then the proton moves toward the cathode through the electrolyte membrane, and the electron moves to the cathode through an external circuit, such that the oxygen molecule, the hydrogen ion, and the electron react together on the cathode to generate electricity and heat and generate condensate water ($H_2O$) as a reaction byproduct.

Referring to FIG. 1, the condensate water generated by the stack 10 is discharged through the cathode outlet of the stack 10 to be collected in a water trap 20, and when an amount of the condensate water collected in the water trap 20 is sensed by a level sensor (not illustrated) as being a predetermined level or more, a drain valve 22 mounted on the outlet of the water trap 20 is opened for a predetermined time, such that a part of the condensate water collected in the water trap 20 is discharged to a shell side of a humidifier 30.

For reference, the humidifier converts dry air supplied from the air supply system into humidified air to supply the humidified air to the cathode of the stack, and has a bundle type hollow fiber membrane through which the dry air passes disposed therein.

Therefore, the condensate water discharged to the shell side of the humidifier 30 from the water trap 20 serves to penetrate into the hollow fiber membrane arranged on the central portion of the shell of the humidifier 30 to convert the dry air into the humidified air.

Meanwhile, the hydrogen supplied to the stack from the hydrogen supply system reacts with the air to generate nitrogen, and when the nitrogen gradually builds up within the stack, the concentration of the hydrogen within the stack is reduced, and furthermore, when the concentration of the hydrogen is reduced to a predetermined level or more, the reaction hydrogen for generating electricity may be reduced, thereby resulting in the reduction in the performance of the stack while a voltage of the unit cell is reduced.

Therefore, to reduce the concentration of the nitrogen which builds up within the stack, as illustrated in FIG. 1, a hydrogen purge valve 12 mounted on a hydrogen purge line of the stack 10 is opened during a predetermined time such that the nitrogen and the non-reaction hydrogen are purged to the shell side of the humidifier 30, thereby maintaining the concentration of the hydrogen within the stack to a predetermined level or more to prevent the reduction in the performance of the stack.

At this time, the nitrogen and oxygen purged to the shell side of the humidifier 30 are discharged to the atmosphere through an exhaust line 32 connected to the humidifier 30.

However, upon cold operation of the fuel cell system, as the condensate water is frozen on the outlet of the cathode of the stack, when the nitrogen and the non-reaction hydrogen are purged to the shell side of the humidifier through the outlet of the cathode, the pressure of the cathode side is increased by the frozen condensate water, such that there is a problem in that an inverse voltage due to the backflow of the air supplied to the cathode of the stack toward the anode is generated.

Further, if the air is excessively supplied from the air supply system toward the humidifier in the state where the condensate water generated by the stack is collected in the water trap and then discharged to the shell side of the humidifier, there is a problem in that the condensate water discharged to the shell side of the humidifier is sucked to the inlet of the cathode of the stack together with the air, thereby causing a flooding phenomenon in the stack.

The above information disclosed in this Background section is only for enhancement of understanding of the background of the disclosure and accordingly it may contain information that does not form the prior art that is already known in this country to a person of ordinary skill in the art.

SUMMARY

The present disclosure is devised to solve the above problems, and an object of the present disclosure is to provide a system and a method for purging the condensate water and hydrogen of a fuel cell stack, which may directly bypass the condensate water and hydrogen discharged from a stack to an exhaust line of a humidifier rather than a shell side of the humidifier to be purged to the atmosphere according to the operation state and operation condition of the stack, thereby eliminating a problem in that an inverse voltage is generated upon cold operation of a fuel cell system, a flooding phenomenon occurs in the stack, or the like to improve the operation stability of the stack and the operation efficiency of the fuel cell system.

An exemplary embodiment of the present disclosure for achieving the object provides a system for purging the condensate water and hydrogen of a fuel cell stack including an integrated purge valve to which a hydrogen purge line of a stack, and an outlet line of a water trap collecting condensate water generated by the stack are connected together, a three-way purge bypass valve mounted on the outlet of the integrated purge valve, a discharge line connected between a first outlet of the three-way purge bypass valve and a shell side of a humidifier, and a bypass line connected between a second outlet of the three-way purge bypass valve and an exhaust line of the humidifier.

According to the exemplary embodiment of the present disclosure, when the pressure of a cathode of the stack is increased to a predetermined level or more in the cold start and cold operation state of a fuel cell system, the integrated purge valve is opened and, at the same time, the three-way purge bypass valve is opened toward the bypass line connected to the exhaust line of the humidifier.

On the other hand, when the pressure of the cathode of the stack is at a normal level which is less than the predetermined level, the integrated purge valve is opened and, at the same time, the three-way purge bypass valve is opened toward the discharge line connected to the shell side of the humidifier.

According to the exemplary embodiment of the present disclosure, when it is determined that the relative humidity within the stack exceeds a reference value, it is determined that the concentration of hydrogen at an anode side within the stack is a reference value or less, or it is determined that a cell flooding occurs, the integrated purge valve is opened and, at the same time, the three-way purge bypass valve is opened toward the bypass line connected to the exhaust line of the humidifier.

On the other hand, when it is determined that the relative humidity within the stack satisfies a reference value, the concentration of hydrogen at an anode side within the stack satisfies a reference value, and a cell flooding does not occur within the stack, the integrated purge valve is opened and, at the same time, the three-way purge bypass valve is opened toward the discharge line connected to the shell side of the humidifier.

Another exemplary embodiment of the present disclosure for achieving the object provides a method for purging the condensate water and hydrogen of a fuel cell stack including determining whether the cold start and cold operation of a fuel cell system are performed, determining whether the pressure of a cathode of the stack is increased, when the fuel cell system is in the cold start and cold operation state, discharging the condensate water and non-reaction residual hydrogen discharged from the cathode of the stack to the atmosphere through an exhaust line of a humidifier, when it is determined that the pressure of the cathode of the stack is increased to a predetermined level or more, and discharging the condensate water and non-reaction residual hydrogen discharged from the cathode of the stack to a shell side of the humidifier, when the pressure of the cathode of the stack is at a normal level which is less than the predetermined level.

In the discharging of the condensate water and the non-reaction residual hydrogen to the atmosphere through the exhaust line of the humidifier, an integrated purge valve to which a hydrogen purge line of the stack and an outlet line of a water trap are connected together is opened and, at the same time, a three-way purge bypass valve mounted on the outlet of the integrated purge valve is opened toward the exhaust line of the humidifier.

In the discharging of the condensate water and the non-reaction residual hydrogen to the shell side of the humidifier, an integrated purge valve to which a hydrogen purge line of the stack and an outlet line of a water trap are connected together is opened and, at the same time, a three-way purge bypass valve mounted on the outlet of the integrated purge valve is opened toward the shell side of the humidifier.

Another exemplary embodiment of the present disclosure further includes determining whether the relative humidity within the stack satisfies a reference value, whether the concentration of hydrogen within the stack satisfies a reference value, or whether a cell flooding occurs in a plurality of cells configuring the stack due to the condensate water is performed, when it is determined that the fuel cell system is in the normal start and normal operation state rather than the cold start and cold operation state.

Therefore, when it is determined that the relative humidity within the stack exceeds the reference value, it is determined that the concentration of the hydrogen at an anode side within the stack is a reference value or less, or it is determined that the cell flooding occurs within the stack, the integrated purge valve is opened and, at the same time, the three-way purge bypass valve is opened toward the exhaust line of the humidifier.

On the other hand, when it is determined that the relative humidity within the stack satisfies the reference value, the concentration of the hydrogen at the anode side within the stack satisfies the reference value, and the cell flooding does not occur within the stack, the integrated purge valve is opened and, at the same time, the three-way purge bypass valve is opened toward a discharge line connected to the shell side of the humidifier.

The present disclosure provides the following effects through the above configuration.

First, it is possible to prevent the inverse voltage phenomenon caused by the backflow of the air of the cathode side toward the anode when hydrogen is purged by increasing the pressure of the cathode as the condensate water condensed on the outlet of the cathode of the stack is frozen, upon cold start and cold operation of the fuel cell system.

Second, by allowing the nitrogen and the residual hydrogen building up within the stack to be directly purged to the atmosphere without passing through the humidifier, a large amount of nitrogen and residual hydrogen may be purged at once, thereby preventing the reduction in the durability and lifespan of related valve series and the like due to the conventional frequent purge of the hydrogen.

Third, it is possible to allow the condensate water from the stack to be directly purged to the atmosphere using the differential pressure with the atmosphere without being discharged to the shell side of the humidifier, thereby preventing the conventional flooding phenomenon caused by the suction of the condensate water discharged to the shell side of the humidifier to the inlet of the cathode of the stack together with the air to prevent the shell flooding phenomenon.

Fourth, when it is determined that the relative humidity (RH) within the stack exceeds the reference value, or it is determined that the concentration of the hydrogen at the anode side within the stack is the reference value or less, the purge of the residual hydrogen including the condensate water and the nitrogen to the atmosphere is performed by the three-way purge bypass valve and the bypass line, such that the relative humidity and the concentration of the hydrogen of the stack may be adjusted to the proper levels according to the operation condition and state of the stack, thereby achieving the improvement in the durability of the stack.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
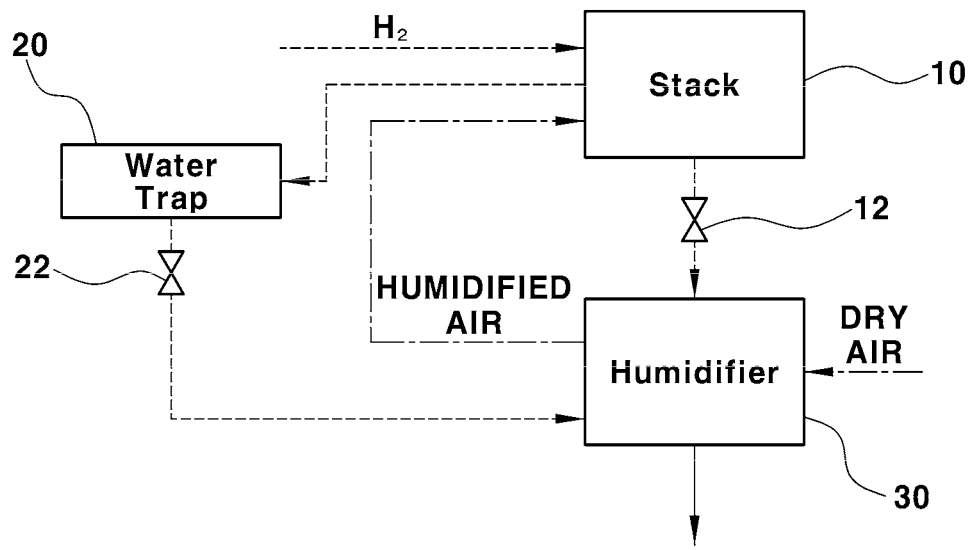
FIG. 1 is a schematic diagram illustrating a conventional system for purging the condensate water and hydrogen of a fuel cell stack.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, a preferred exemplary embodiment of the present disclosure will be described in detail with reference to the accompanying drawings.

Figure 2:
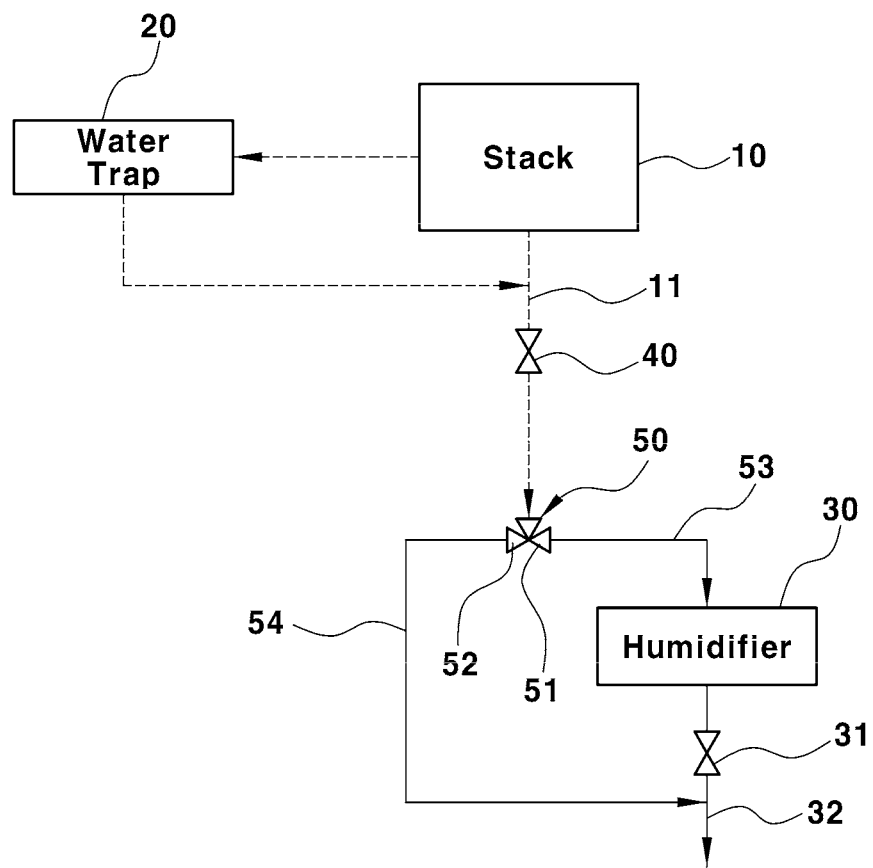
FIG. 2 is a schematic diagram illustrating a system for purging the condensate water and hydrogen of a fuel cell stack according to the present disclosure.

FIG. 2 is a diagram illustrating a configuration of a system for purging the condensate water and hydrogen of a fuel cell stack according to the present disclosure, and a reference numeral 10 indicates a fuel cell stack.

A hydrogen purge line 11 connected to the outlet of an anode of the stack 10 is mounted with an integrated purge valve 40.

Further, an outlet line of a water trap 20 collecting the condensate generated by the stack 10 is connected to the inlet of the integrated purge valve 40.

The integrated purge valve 40 is a valve in which a hydrogen purge valve mounted on a conventional hydrogen purge line and a drain valve mounted on the outlet of the water trap are integrated to one, and serves to discharge the condensate water collected in the water trap 20 through the ON/OFF opening and closing operation and the nitrogen and non-reaction residual hydrogen discharged through the outlet of the anode of the stack 10 toward a three-way purge bypass valve 50.

Therefore, the condensate water generated by the stack 10 is discharged through the outlet of the cathode of the stack 10 and collected in the water trap 20, and then when an amount of condensate water collected in the water trap 20 is sensed by a level sensor (not illustrated) as being at or above a predetermined level, the integrated purge valve 40 is opened during a predetermined time, such that the condensate water may be discharged to a shell side of a humidifier 30.

Further, to reduce the concentration of the nitrogen which builds up within the stack 10, when the integrated purge valve 40 is opened during a predetermined time, the nitrogen and the non-reaction hydrogen may be purged to the shell side of the humidifier 30 from the stack 10.

According to the present disclosure, the outlet of the integrated purge valve 40 is mounted with the three-way purge bypass valve 50.

Particularly, a discharge line 53 is connected between a first outlet 51 of the three-way purge bypass valve 50 and the shell side of the humidifier 30, and a bypass line 54 is connected between a second outlet 52 of the three-way purge bypass valve 50 and an exhaust line 32 of the humidifier 30.

Therefore, the condensate water and the hydrogen discharged from the stack 10 may be directly bypassed to the exhaust line 32 of the humidifier 30 through the bypass line 54 connected to the second outlet 52 of the three-way purge bypass valve 50 to be purged to the atmosphere, according to the operation state and operation condition of the stack 10, without being discharged to the shell side of the humidifier 30.

Meanwhile, the inlet side of the exhaust line 32 of the humidifier 30 is mounted with a pressure adjustment valve 31 adjusting the air pressure within the humidifier and blocking the penetration of outside air.

Figure 3:
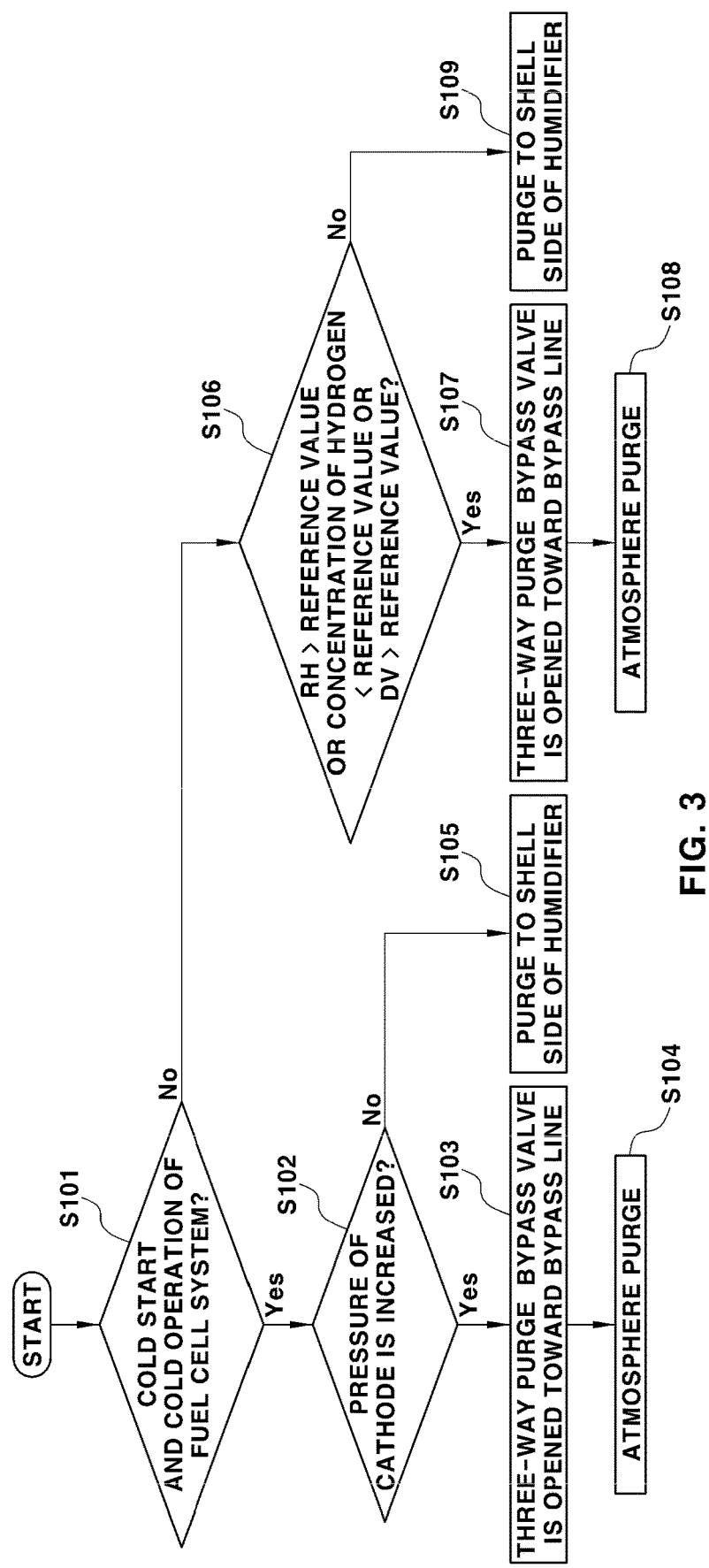
FIG. 3 is a flowchart illustrating the operation flow of the system for purging the condensate water and hydrogen of the fuel cell stack according to the present disclosure.

Here, a process of purging the condensate water and hydrogen of the fuel cell stack performed based on the above configuration will be described with reference to FIGS. 2 and 3 as follows.

First, whether the cold start and cold operation of the fuel cell system including the stack is performed is determined at S101.

For example, when the temperature of the outside air is 2° C. or less, it may be determined that the fuel cell system is in the cold start and cold operation state.

When the fuel cell system is in the cold start and cold operation state, whether the pressure of the cathode of the stack is increased is determined at S102.

For example, when the pressure of the cathode and the pressure of the anode of the stack are maintained at the same levels during a predetermined time or more (e.g., 5 seconds), a differential pressure between the cathode and the anode is increased to a reference value or more, such that it may be determined that the pressure of the cathode is increased to a predetermined level or more.

At this time, the reason why the pressure of the cathode of the stack is increased is that a part of the condensate water is frozen on the outlet of the cathode of the stack upon cold operation of the fuel cell system, and when the pressure of the cathode of the stack is increased as described above, there occurs a problem in that an inverse voltage is generated by the backflow of the air supplied to the cathode toward the anode.

To solve the problem, when it is determined that the pressure of the cathode of the stack 10 is increased to a predetermined level or more, the integrated purge valve 40 is opened by a control signal of a controller and, at the same time, the three-way purge bypass valve 50 is opened toward the second outlet 52 to which the bypass line 54 is connected at S103.

Therefore, the outlet of the cathode of the stack 10 becomes a state of communicating with the exhaust line 32 of the humidifier 30 communicating with the atmosphere through the bypass line 54.

At this time, the first outlet 51 of the three-way purge bypass valve 50 is maintained as the state of being closed.

Therefore, the atmosphere purge, in which the condensate water, the non-reaction residual hydrogen, and the like from the cathode of the stack are directly discharged to the atmosphere through the exhaust line 32 of the humidifier 30 by passing through the three-way purge bypass valve 50 and the bypass line 54, is performed at S104.

As described above, upon cold start and cold operation condition of the fuel cell system including the stack, by allowing the condensate water and hydrogen discharged from the stack 10 to be directly bypassed to the exhaust line 32 of the humidifier 30 through the bypass line 54 connected to the second outlet 52 of the three-way purge bypass valve 50 without discharging the condensate water and hydrogen to the shell side of the humidifier so as to be purged to the atmosphere, it is possible to reduce the pressure of the cathode of the stack, and prevent the phenomenon in which an inverse voltage is generated by the backflow of the air supplied to the cathode of the stack toward the anode.

On the other hand, as the determination result of the step S102, when it is determined that the pressure of the cathode of the stack is not increased to a predetermined lever or more, that is, when the pressure of the cathode of the stack is at a normal level which is less than the predetermined level, if the water discharge and the hydrogen purge are needed, the integrated purge valve 40 is opened by the control signal of the controller and, at the same time, the three-way purge bypass valve 50 is opened toward the first outlet 51.

At this time, the three-way purge bypass valve 50 is maintained in the state where the second outlet 52 side is closed.

Therefore, the condensate water and residual hydrogen discharged from the stack 10 are purged toward the shell side of the humidifier 30 along the first outlet 51 and the discharge line 53 of the three-way purge bypass valve 50 at S105, and the discharged condensate water is used to convert the dry air into humidified air within the humidifier, and the discharged residual hydrogen is discharged to the atmosphere through the exhaust line 32 of the humidifier 30.

Meanwhile, as the determination result of the step S101, when the fuel cell system including the stack is not in the cold start and cold operation state, that is, when it is determined that the fuel cell system is in the normal start and normal operation state, whether the relative humidity (RH) within the stack satisfies a reference value, whether the concentration of the hydrogen within the stack satisfies a reference value, whether the cell flooding is caused by the condensate water in a plurality of cells configuring the stack, and the like are determined at S106.

That is, whether the relative humidity (RH) within the stack exceeds the reference value, whether the concentration of the hydrogen at the anode side within the stack is the reference value or less, and whether the cell flooding occurs are determined.

For the cell flooding, it is determined that the cell flooding occurs when a differential voltage (DV) between the plurality of cells is 40 mV or more.

Therefore, when it is determined that the relative humidity (RH) within the stack exceeds the reference value (based on a target RH map), it is determined that the concentration of the hydrogen at the anode side within the stack is the reference value or less, or it is determined that the cell flooding occurs, the integrated purge valve 40 is opened by the control signal of the controller and, at the same time, the three-way purge bypass valve 50 is opened toward the second outlet 52 to which the bypass line 54 is connected at S107.

Subsequently, the atmosphere purge, in which the condensate water and the residual hydrogen including nitrogen from the stack is directly discharged to the atmosphere through the exhaust line 32 of the humidifier 30 by passing through the three-way purge bypass valve 50 and the bypass line 54, is performed at S108.

Therefore, when it is determined that the relative humidity (RH) within the stack exceeds the reference value (based on the target RH map), it is possible to allow the condensate water from the stack to be directly purged to the atmosphere through the exhaust line of the humidifier without discharging the condensate water to the shell side of the humidifier, thereby adjusting the relative humidity (RH) within the stack to a level satisfying the reference value.

Further, when it is determined that the cell flooding occurs, it is possible to allow the condensate water from the stack to be directly purged to the atmosphere through the exhaust line of the humidifier without discharging the condensate water to the shell side of the humidifier, thereby preventing the conventional flooding phenomenon caused by the suction of the condensate water discharged to the shell side of the humidifier to the inlet of the cathode of the stack together with the air.

Meanwhile, the hydrogen supplied to the stack reacts with the air to generate nitrogen, and when the nitrogen gradually builds up within the stack, the concentration of the hydrogen within the stack is reduced, and when the concentration of the hydrogen is reduced to a predetermined level or more, the reaction hydrogen for generating electricity may be reduced, thereby resulting in the reduction in the performance of the stack while the voltage of the unit cell is reduced.

Therefore, when it is determined that the concentration of the hydrogen at the anode side within the stack is the reference value or less, by allowing the non-reaction residual hydrogen including nitrogen to be directly purged to the atmosphere through the exhaust line of the humidifier as described above, without being discharged to the shell side of the humidifier from the stack, the purge pressure resistance does not occur compared to the operation of discharging the non-reaction residual hydrogen to the atmosphere through the shell side of the humidifier. Thus, it is possible to purge the non-reaction residual hydrogen including nitrogen to the atmosphere more quickly, thereby reducing the concentration of the nitrogen within the stack to adjust the concentration of the hydrogen supplied to the stack to the reference value or more, and preventing the reduction in the performance of the stack.

On the other hand, as the determination result of the step S106, when it is determined that the relative humidity (RH) within the stack does not exceed the reference value (based on the target RH map), it is not determined that the concentration of the hydrogen at the anode side within the stack is the reference value or less, and it is determined that the cell flooding does not occur, if the water discharge and the hydrogen purge are needed, the integrated purge valve 40 is opened by the control signal of the controller and, at the same time, the three-way purge bypass valve 50 is opened toward the first outlet 51.

That is, when it is determined that the relative humidity within the stack satisfies the reference value, the concentration of the hydrogen at the anode side within the stack satisfies the reference value, and the cell flooding does not occur within the stack, the integrated purge valve 40 is opened and, at the same time, the three-way purge bypass valve 50 is opened toward the discharge line 53 connected to the shell side of the humidifier 30.

Therefore, the condensate water and residual hydrogen discharged from the stack 10 are purged toward the shell side of the humidifier 30 along the first outlet 51 and the discharge line 53 of the three-way purge bypass valve 50 at S109, and the discharged condensate water is used to convert the dry air into the humidified air within the humidifier, and the discharged residual hydrogen is discharged to the atmosphere through the exhaust line 32 of the humidifier 30.

While a number of exemplary aspects and embodiments have been discussed above, those of skill in the art will recognize that still further modifications, permutations, additions and sub-combinations thereof of the features of the disclosed embodiments are still possible.

The invention claimed is:

1. A system for purging the condensate water and hydrogen of a fuel cell stack comprising:
   an integrated purge valve having an outlet, the integrated purge valve being connected to a hydrogen purge line of a fuel cell stack and an outlet line of a water trap collecting condensate water generated by the fuel cell stack;
   a three-way purge bypass valve mounted on the outlet of the integrated purge valve;
   a discharge line connected between a first outlet of the three-way purge bypass valve and a shell side of a humidifier; and
   a bypass line connected between a second outlet of the three-way purge bypass valve and an exhaust line of the humidifier.

2. The system for purging the condensate water and hydrogen of the fuel cell stack of claim 1, wherein when a pressure of a cathode of the fuel cell stack is increased to or above a predetermined level in the cold start and cold operation state of a fuel cell system, the integrated purge valve is opened, and at the same time, the three-way purge bypass valve is opened toward the bypass line connected to the exhaust line of the humidifier.

3. The system for purging the condensate water and hydrogen of the fuel cell stack of claim 2, wherein when the pressure of the cathode of the fuel cell stack is at a normal level, which is less than the predetermined level, the integrated purge valve is opened, and at the same time, the three-way purge bypass valve is opened toward the discharge line connected to the shell side of the humidifier.

4. The system for purging the condensate water and hydrogen of the fuel cell stack of claim 1, wherein when it is determined that the relative humidity within the fuel cell stack exceeds a reference value, it is also determined that the concentration of hydrogen at an anode side within the fuel cell stack is at or below a reference value, or it is determined that a cell flooding occurs, the integrated purge valve is opened, and at the same time, the three-way purge bypass valve is opened toward the bypass line connected to the exhaust line of the humidifier.

5. The system for purging the condensate water and hydrogen of the fuel cell stack of claim 1, wherein when it is determined that the relative humidity within the fuel cell stack satisfies a reference value, the concentration of hydrogen at an anode side within the fuel cell stack satisfies a reference value, and a cell flooding does not occur within the fuel cell stack, the integrated purge valve is opened, and at the same time, the three-way purge bypass valve is opened toward the discharge line connected to the shell side of the humidifier.

6. A method for purging the condensate water and hydrogen of a fuel cell stack, the method comprising:
   determining whether a cold start and cold operation of a fuel cell system are performed;
   determining whether a pressure of a cathode of the fuel cell stack is increased, when the fuel cell system is in the cold start and cold operation state;
   upon determining that the pressure of the cathode of the fuel stack is increased to or above a predetermined level, discharging the condensate water and non-reaction residual hydrogen discharged from the cathode of the fuel cell stack to the atmosphere through an exhaust line of a humidifier; and
   upon determining that the pressure of the cathode of the stack is at a normal level, which is less than the predetermined level, discharging the condensate water and non-reaction residual hydrogen discharged from the cathode of the stack to a shell side of the humidifier.

7. The method of claim 6 wherein in the discharging of the condensate water and the non-reaction residual hydrogen to the atmosphere through the exhaust line of the humidifier, an integrated purge valve to which a hydrogen purge line of the stack and an outlet line of a water trap are connected together is opened, and at the same time, a three-way purge bypass valve mounted on the outlet of the integrated purge valve is opened toward the exhaust line of the humidifier.

8. The method of claim 6, wherein in the discharging of the condensate water and the non-reaction residual hydrogen to the shell side of the humidifier, an integrated purge valve to which a hydrogen purge line of the stack and an outlet line of a water trap are connected together is opened, and at the same time, a three-way purge bypass valve mounted on the outlet of the integrated purge valve is opened toward the shell side of the humidifier.

9. The method of claim 6, wherein when it is determined that the fuel cell system is in a normal start and normal operation state rather than the cold start and cold operation state, determining whether a relative humidity within the fuel cell stack satisfies a reference value, whether the concentration of hydrogen within the fuel cell stack satisfies a reference value, or whether a cell flooding occurs in a plurality of cells configuring the fuel cell stack due to the condensate water is performed.

10. The method of claim 9, wherein when it is determined that the relative humidity within the fuel cell stack exceeds the reference value, it is determined that the concentration of the hydrogen at an anode side within the fuel cell stack is a reference value or less, or it is determined that the cell flooding occurs within the fuel cell stack, the integrated purge valve is opened, and at the same time, the three-way purge bypass valve is opened toward the exhaust line of the humidifier.

11. The method of claim 10, wherein when it is determined that the relative humidity within the fuel cell stack exceeds the reference value, the condensate water from the fuel cell stack is purged to the atmosphere through the exhaust line of the humidifier.

12. The method of claim 10, wherein when it is determined that the cell flooding occurs, the condensate is purged to the atmosphere through the exhaust line of the humidifier from the fuel cell stack.

13. The method of claim 10, wherein when it is determined that the concentration of the hydrogen at the anode side within the fuel cell stack is the reference value or less, the non-reaction residual hydrogen comprising nitrogen is purged to the atmosphere through the exhaust line of the humidifier from the fuel cell stack.

14. The method of claim 9, wherein when it is determined that the relative humidity within the fuel cell stack satisfies the reference value, the concentration of the hydrogen at the anode side within the fuel cell stack satisfies the reference value, and the cell flooding does not occur within the fuel cell stack, the integrated purge valve is opened, and at the same time, the three-way purge bypass valve is opened toward a discharge line connected to the shell side of the humidifier.

\* \* \* \* \*